(12) United States Patent
Rackebrandt et al.

(10) Patent No.: US 8,615,872 B2
(45) Date of Patent: Dec. 31, 2013

(54) METHOD OF MANUFACTURING A FLOW MEASUREMENT DEVICE

(75) Inventors: Karl-Heinz Rackebrandt, Adelebsen (DE); Klaus Schäfer, Hannoversch Münden (DE); Marco Ehrenberg, Bad Sooden-Allendorf (DE)

(73) Assignee: ABB Technology AG, Zurich (CH)

( * ) Notice: Subject to any disclaimer, the term of this patent is extended or adjusted under 35 U.S.C. 154(b) by 1113 days.

(21) Appl. No.: 12/543,322

(22) Filed: Aug. 18, 2009

(65) Prior Publication Data

US 2010/0037452 A1    Feb. 18, 2010

(30) Foreign Application Priority Data

Aug. 18, 2008 (DE) .......................... 10 2008 038 161

(51) Int. Cl.
*H01K 3/22* (2006.01)

(52) U.S. Cl.
USPC ............... 29/848; 29/606; 29/832; 73/861.11

(58) Field of Classification Search
USPC ........ 29/600, 601, 602.1, 606, 607, 832, 841, 29/846, 848; 73/861.11, 861.12
See application file for complete search history.

(56) References Cited

U.S. PATENT DOCUMENTS

| | | | |
|---|---|---|---|
| 4,499,754 A | 2/1985 | Akano et al. | |
| 5,280,727 A * | 1/1994 | Hafner et al. | 73/861.12 |
| 6,269,530 B1 * | 8/2001 | Armitage et al. | 29/602.1 |
| 6,789,432 B2 * | 9/2004 | Guazzoni et al. | 73/861.12 |
| 2005/0193833 A1 | 9/2005 | Huybrechts et al. | |

FOREIGN PATENT DOCUMENTS

| | | |
|---|---|---|
| DE | 1 548 918 A | 10/1969 |
| DE | 195 35 997 A1 | 4/1997 |
| DE | 698 21 474 T2 | 12/2004 |
| EP | 1 193 474 A1 | 4/2002 |
| WO | WO 99/36749 A1 | 7/1999 |

OTHER PUBLICATIONS

German Search Report dated May 20, 2009.
German Search Report dated May 28, 2009.

* cited by examiner

*Primary Examiner* — Donghai D Nguyen
(74) *Attorney, Agent, or Firm* — Buchanan Ingersoll & Rooney PC

(57) ABSTRACT

A flow measurement device and a method of manufacturing a flow measurement device having a measurement tube made from plastic or at least a plastic liner are provided. According to an exemplary embodiment, the measurement tube can be fabricated from plastic in an injection molding apparatus. Thereafter, electrical components of the measurement tube, such as electrodes and a coil holder, for example, can be concomitantly injection molded in a common, separate injection molding process. The electrical components can there be installed easier and more reliably in position.

15 Claims, 1 Drawing Sheet

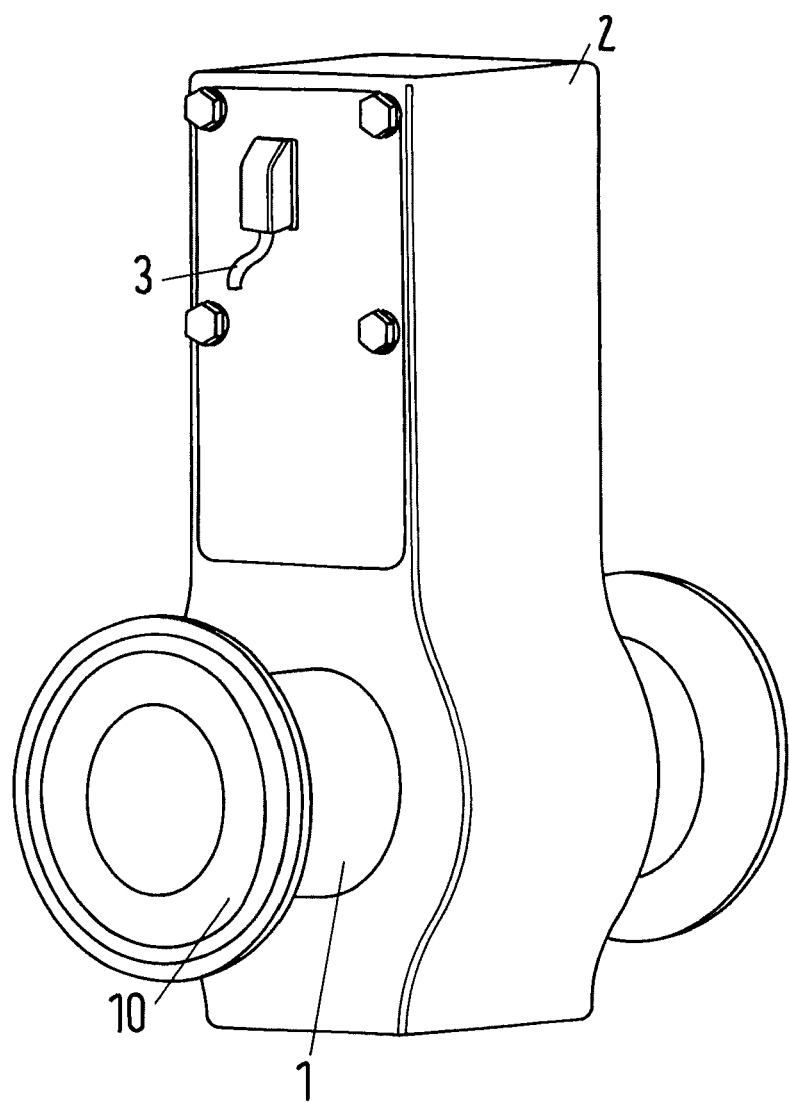

METHOD OF MANUFACTURING A FLOW MEASUREMENT DEVICE

RELATED APPLICATIONS

This application claims priority under 35 U.S.C. §119 to German Patent Application No. 10 2008 038 161.6 filed in Germany on Aug. 18, 2008, the entire content of which is hereby incorporated by reference in its entirety.

FIELD

The present disclosure relates to a flow measurement device having a measurement tube made from plastic.

BACKGROUND INFORMATION

Flow measurement devices of this type are known to operate by magnetic induction with the aid of a magnet system. The magnet system is arranged on an external (outside) surface of on the measurement tube, and electrodes in contact with a substance to be measured are arranged on an internal (inside) surface of the measurement tube. However, capacitive flow measurement devices are also known to operate with electrodes that are not in contact with the substance to be measured.

EP 1 193 474 A1 has disclosed examples of magnetically inductive flow measurement devices as well as capacitive flow measurement devices having a plastic measurement tube. The electrodes are embedded in a plastic measurement tube in this publication.

SUMMARY

An exemplary embodiment provides a method of manufacturing a flow measurement device having a measurement tube made from plastic in which electrodes in contact with a substance to be measured are arranged. The exemplary method comprises fabricating the measurement tube together with process connections in one piece from plastic in an injection molding process. In addition, the method comprises fabricating the electrodes, a coil holder and electrical components of the measurement tube concomitantly in a common injection molding process separate from the fabrication of the measurement tube and process connections.

BRIEF DESCRIPTION OF THE DRAWINGS

Additional features, advantages and refinements of the present disclosure are described in more detail below with reference to an exemplary embodiment illustrated in the drawing, in which:

FIG. 1 shows a perspective illustration of an exemplary flow measurement device.

DETAILED DESCRIPTION

Exemplary embodiments of the present disclosure provide a flow measurement device having an improved effect that the electrical components can be installed more easily and more reliably in position.

An exemplary embodiment of the present disclosure provides a method of manufacturing a flow measurement device, according to which electrical components of the flow measurement device can be installed easier and more reliably in position.

An exemplary embodiment of the present disclosure provides that the measurement tube is fabricated from plastic in an injection molding process, and electrical components thereof are concomitantly injection molded in a common separate injection molding process.

A permanent and mechanically protected arrangement of the electrical components can thereby be achieved. According to an exemplary embodiment, the molding does not necessarily have to form the outer housing of the unit at the same time. It can also be advantageous to secure the electrical components in position in this way.

According to an exemplary embodiment, at least one process connection made of plastic can also be integrally formed in one piece on the measurement tube. This produces an arrangement that can easily be mounted, such as in the case where there is no longer any need for a welded connection between the measurement tube and process connection.

According to an exemplary embodiment, at least one of the electrical components can be the magnet system of a flow measurement device that operates as an inductive flow measurement device and is concomitantly injection molded. The design as an inductive flow measurement device is therefore particularly advantageous.

According to an exemplary embodiment, electrical circuits or components of the flow measurement device that serve to drive the electrodes and/or the magnet system can be concomitantly injection molded.

According to an exemplary embodiment, it is advantageous when the common injection molded part is an injection molded part forming the outer housing.

The refinement in the case of which the outer housing formed by the injection molded part is provided with a metal surface is particularly advantageous. A highly effective electric shielding can be achieved in a simple way such that there can be no electromagnetic fields causing interference from outside on the cast in electronic elements or on the electrodes.

It is an advantageous refinement that the electrodes can be discrete metal electrically conductive electrodes, for example.

According to an exemplary embodiment, the electrodes can be electrodes or areas in the plastic of the measurement tube that are formed of electrically conductive plastic.

According to an exemplary embodiment, to fasten the exemplary magnet system described above, in the case of a magnetically inductive flow measurement device, guiding and fastening aids for a magnet system can be concomitantly injection molded in one piece.

The same holds true for the fact that guiding and fastening aids for the cables and/or cable routes are concomitantly injection molded.

A capacitive flow measurement device can also advantageously have such a design.

FIG. 1 shows a perspective illustration of an exemplary flow measurement device having a measurement tube 1 and an integrally extruded housing 2. According to an exemplary embodiment, any conventional injection molding method can be used to produce a base unit including the measurement tube 1 and process connections 10. According to an exemplary embodiment, the process connections 10 can include connection flanges formed of plastic. The process connections 10 can be produced in one piece with the measurement tube 1 in an injection molding method. However, it is to be understood that while the process connections 10 can be integrally formed with the measurement tube 1, the present disclosure is not limited thereto. On the other hand, the measurement 1 can be formed from a separate injection molding process, for example, from the injection molding process used to form the process connections 10. Furthermore, while exemplary embodiments are described herein as utilizing an injection molding process, it is to be understood that this process is one example of a formation process in which the present disclosure can be implemented.

Electrical connection cables and, if appropriate, their respective cable routing elements, such as clamps or clips, for example, can then be integrally extruded or bonded onto the base unit using plastic injection molding technology, for example.

Electrical components such as circuits, drives or preamplifiers for electrodes etc., can then be concomitantly cast in after fixing, for example.

Moreover, in the case of an inductive flow measurement device, the magnet system can be concomitantly injection molded or fastened outside on the measurement tube together with all its electrical components.

Subsequent to the molding process(es) for forming the measurement tube 1 and process connection 10, another molding process can be performed to concomitantly cast in all elements of the flow measurement device. For example, electrical and associated mechanical instruments of the flow measurement device can be mounted on the measurement tube, in a manner as illustrated in the example of FIG. 1. For instance, such electrical and mechanical components and instruments can be molded concomitantly in a last injection molding step, subsequent to the molding process(es) for forming the measurement tube 1 and/or process connection 10, so as to form the housing 2. The connection cables 3 can then be made to emerge at a location on the housing 2.

Exemplary embodiments of the present disclosure provide not only a substantially simple production methodology, but the device formed thereby results in a very solid component overall that delivers high mechanical resistance.

According to an exemplary embodiment, the housing 2 can be formed of plastic, for example, and segments of the measurement tube 1 and, if appropriate, process connections 10 of the measurement tube 1 projecting from the housing 2 can be provided with a metal layer, for example by vapor coating.

This exemplary metal coating can be applied in an effectively bonding fashion with the aid of a conducting intermediate layer, for example. The metal coating can constitutes an excellent electrical shield, for example, that can advantageously be produced with substantial ease. Thus, in the case of such a plastic system, for example, a degree of shielding can be achieved similar to a metal design having a metal measurement tube and metal housing.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A method of manufacturing a flow measurement device having a measurement tube made from plastic in which electrodes in contact with a substance to be measured are arranged, the method comprising:
    fabricating the measurement tube together with process connections in one piece from plastic in an injection molding process; and
    fabricating the electrodes, a coil holder and electrical components of the measurement tube concomitantly in a common injection molding process separate from the fabrication of the measurement tube and process connections.

2. The method of manufacturing a flow measurement device as claimed in claim 1, comprising integrally forming at least one process connection formed of plastic on the measurement tube in one piece with the fabrication of the measurement tube.

3. The method of manufacturing a flow measurement device as claimed in claim 1, wherein at least one of the electrical components concomitantly injection molded with the electrodes is a magnet system of a flow measurement device configured to operate as an inductive flow measurement device.

4. The method of manufacturing a flow measurement device as claimed in claim 3, comprising concomitantly injection molding electrical circuits or components thereof that serve to drive the electrodes with the electrodes.

5. The method of manufacturing a flow measurement device as claimed in claim 4, wherein the electrodes are discrete metal electrically conductive electrodes.

6. The method of manufacturing a flow measurement device as claimed in claim 1, wherein the common injection molded part is an injection molded part forming an outer housing of the flow measurement device.

7. The method of manufacturing a flow measurement device as claimed in claim 6, comprising providing the outer housing formed by the injection molded part with a metal surface.

8. The method of manufacturing a flow measurement device as claimed in claim 1, wherein the electrodes are discrete metal electrically conductive electrodes.

9. The method of manufacturing a flow measurement device as claimed in claim 8, wherein the electrodes are discrete electrodes or areas in the plastic of the measurement tube that are formed of electrically conductive plastic.

10. The method of manufacturing a flow measurement device as claimed in claim 1, wherein the flow measurement device is a magnetically inductive flow measurement device, and the method comprises concomitantly injection molding guiding and fastening aids for a magnet system of the magnetically inductive flow measurement device in one piece.

11. The method of manufacturing a flow measurement device as claim in claim 10, comprising concomitantly injection molding the guiding and fastening aids with the electrical components, electrodes and coil holder.

12. The method of manufacturing a flow measurement device as claimed in claim 1, wherein guiding and fastening aids for cables and/or cable routes of the flow measurement device are concomitantly injection molded.

13. The method of manufacturing a flow measurement device as claimed in claim 12, comprising concomitantly injection molding the guiding and fastening aids for the cables and/or cable routes with the electrical components, electrodes and coil holder.

14. The method of manufacturing a flow measurement device as claimed in claim 1, wherein the flow measurement device is a capacitive flow measurement device.

15. The method of manufacturing a flow measurement device as claimed in claim 1, wherein the electrodes, the coil holder and the electrical components of the measurement tube are concomitantly fabricated in the common injection molding process after the fabrication of the measurement tube and process connections.

* * * * *